US011217929B2

(12) United States Patent
Yamada et al.

(10) Patent No.: US 11,217,929 B2
(45) Date of Patent: Jan. 4, 2022

(54) CONNECTOR WITH MULTIPLE RESIN PORTIONS

(71) Applicant: SUMITOMO WIRING SYSTEMS, LTD., Mie (JP)

(72) Inventors: Hiroki Yamada, Mie (JP); Koji Shinoda, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/975,359

(22) PCT Filed: Feb. 27, 2019

(86) PCT No.: PCT/JP2019/007533
§ 371 (c)(1),
(2) Date: Aug. 24, 2020

(87) PCT Pub. No.: WO2019/172038
PCT Pub. Date: Sep. 12, 2019

(65) Prior Publication Data
US 2020/0403345 A1    Dec. 24, 2020

(30) Foreign Application Priority Data

Mar. 7, 2018  (JP) .............................. JP2018-041110
Jul. 27, 2018  (JP) .............................. JP2018-141586

(51) Int. Cl.
*H01R 13/405* (2006.01)
*H01R 43/24* (2006.01)

(52) U.S. Cl.
CPC .......... *H01R 13/405* (2013.01); *H01R 43/24* (2013.01)

(58) Field of Classification Search
CPC .. H01R 13/405; H01R 13/424; H01R 13/422; H01R 13/5216; H01R 43/24; H01R 13/631
(Continued)

(56) References Cited

U.S. PATENT DOCUMENTS 6,902,417 B2 * 6/2005 Maegawa .............. H01R 43/24
439/246
2004/0235328 A1 11/2004 Maegawa et al.
(Continued)

FOREIGN PATENT DOCUMENTS

JP    2012-099274 A    5/2012
JP    2016-154072 A    8/2016

OTHER PUBLICATIONS

International Search Report dated Apr. 23, 2019 for WO 2019/172038 A1 (2 pages).

*Primary Examiner* — Edwin A. Leon
*Assistant Examiner* — Milagros Jeancharles
(74) *Attorney, Agent, or Firm* — Abelman, Frayne & Schwab

(57) ABSTRACT

In a connector (1), one end parts (31A) of first terminals (3A), one end parts (31B) of a plurality of second terminals (3B) and one end parts (31C) of a plurality of third terminals (3C) are arranged in parallel to each other along a first direction (D1). One end part (20C) of a third core resin portion (2C) sandwiches one end part (20A) of a first core resin portion (2A) and one end part (20B) of a second core resin portion (2B) from both sides in a second direction (D2). The one end part (20A) of the first core resin portion (2A) and the one end part (20B) of the second core resin portion (2B), and the one end part (20C) of the third core resin portion (2C) are shaped to be locked in a third direction (D3).

7 Claims, 13 Drawing Sheets

(58) Field of Classification Search
USPC .............................................. 439/733.1, 736
See application file for complete search history.

(56) References Cited

U.S. PATENT DOCUMENTS

| | | | |
|---|---|---|---|
| 2019/0036415 A1* | 1/2019 | Kataoka | ............... H05K 5/0069 |
| 2020/0106206 A1* | 4/2020 | Shinoda | ............... H01R 13/514 |
| 2020/0185858 A1* | 6/2020 | Yamada | ............. H01R 13/4362 |

* cited by examiner

CONNECTOR WITH MULTIPLE RESIN PORTIONS

CROSS REFERENCE TO RELATED APPLICATIONS

This application is a national phase of PCT application No. PCT/JP2019/007533, filed on 27 Feb. 2019, which claims priority from Japanese patent application Nos. 2018-041110 and 2018-141586 filed on 7 Mar. 2018 and 27 Jul. 2018, respectively, all of which are incorporated herein by reference.

TECHNICAL FIELD

The present invention relates to a connector including a plurality of core resin portions for covering terminals and an outer resin portion for covering the plurality of core resin portions.

BACKGROUND

A connector is used in electrically wiring various control components to a control device. The connector includes a plurality of terminals to be electrically connected. If the plurality of terminals are arranged in a plurality of stages, insert molding may be performed in stages to facilitate the arrangement of the terminals when a resin material is insert-molded. In this case, the plurality of core resin portions in which the terminals of the respective stages are separately arranged are insert-molded as a primary molding. Subsequently, the outer resin portion in which the plurality of core resin portions are arranged is insert-molded as a secondary molding. In this way, the connector in which the plurality of core resin portions are arranged in the outer resin portion is molded. Such a connector is shown, for example, in patent literature 1.

PRIOR ART DOCUMENT

Patent Document
Patent Document 1: JP 2016-154072A

SUMMARY OF THE INVENTION

Problems to be Solved

In insert-molding the outer resin portion by arranging the plurality of core resin portions inside as the secondary molding, a mold needs to be provided at a location where the resin material for constituting the outer resin portion is to be filled. Accordingly, to simplify the configuration of this mold, it is considered to expose one end parts of the plurality of core resin portions, from which one end parts of the plurality of terminals project, on a surface of the connector without being covered by the outer resin portion. In this case, the one end parts of the plurality of core resin portions are arranged outside a cavity of the mold and the configuration of the cavity of the mold can be simplified.

However, in this case, nothing restrains the one end parts of the plurality of core resin portions after the outer resin portion is molded in the mold and a molded article is taken out from the mold. Thus, when the resin material for constituting the outer resin portion is cooled to contract, a stress may act on the one end parts of the plurality of core resin portions in directions to separate the one end parts of the plurality of core resin portions from each other. At this time, the positions of the one end parts of the plurality of terminals projecting from the one end parts of the plurality of core resin portions may vary to cause a trouble in the electrical connection of the plurality of terminals.

The present invention was developed in view of such a problem and aims to provide a connector capable of preventing a variation in the position of one end part of each terminal projecting from one end part of each core resin portion even if the one end parts of three or more core resin portions are arranged to overlap each other outside an outer resin portion.

Means to Solve the Problem

One aspect of the present invention is directed to a connector with a first terminal, a first core resin portion for covering an intermediate part of the first terminal excluding both end parts, a second terminal, a second core resin portion for covering an intermediate part of the second terminal excluding both end parts, a third terminal, a third core resin portion for covering an intermediate part of the third terminal excluding both end parts, and an outer resin portion for partially covering the first core resin portion, the second core resin portion and the third core resin portion overlapping each other, wherein one end part of the first terminal, one end part of the second terminal and one end part of the third terminal are arranged in parallel to each other along a first direction, one end part of the first core resin portion from which the one end part of the first terminal projects, one end part of the second core resin portion from which the one end part of the second terminal projects and one end part of the third core resin portion from which the one end part of the third terminal projects are arranged to overlap each other outside the outer resin portion, the one end part of the first core resin portion and the one end part of the second core resin portion are facing each other in a second direction orthogonal to the first direction, the one end part of the third core resin portion sandwiches at least a part of the one end part of the first core resin portion and a part of the one end part of the second core resin portion from both sides in the second direction, and the one end part of the first core resin portion and the one end part of the second core resin portion, and the one end part of the third core resin portion are shaped to be locked in a third direction orthogonal to the first and second directions.

Effect of the Invention

In the connector of the one aspect, when the one end parts of three or more core resin portions are arranged to overlap each other outside the outer resin portion, the one end parts of these three or more core resin portions are prevented from being separated from each other.

Specifically, the one end part of the third core resin portion sandwiches at least the part of the one end part of the first core resin portion and the part of the one end part of the second core resin portion from the both sides in the second direction. In this way, even if a stress generated when a resin material for constituting the outer resin portion is cooled to contract acts on the one end parts of the respective core resin portions in insert-molding the outer resin portion with the respective core resin portions inserted, the one end part of the first core resin portion and the one end part of the second core resin portion can be prevented from being separated from each other in the second direction.

Further, the one end part of the first core resin portion and the one end part of the second core resin portion, and the one end part of the third core resin portion are shaped to be locked in the third direction orthogonal to the first and second directions. In this way, even if a stress generated when the resin material for constituting the outer resin portion is cooled to contract acts on the one end parts of the respective core resin portions in insert-molding the outer resin portion with the respective core resin portions inserted, the one end part of the first core resin portion and the one end part of the second core resin portion, and the one end part of the third core resin portion can be prevented from being separated from each other in the third direction.

As just described, in the connector of the one aspect, a variation in the position of the one end part of each terminal can be prevented by preventing the one end parts of the respective core resin portions arranged outside the outer resin portion from being separated from each other in molding the outer resin portion with the respective core resin portions inserted.

Therefore, according to the connector of the one aspect, even if the one end parts of the three core resin portions are arranged to overlap each other outside the outer resin portion, it is possible to prevent a variation in the position of the one end part of each terminal projecting from the one end part of each core resin portion.

DETAILED DESCRIPTION TO EXECUTE THE INVENTION

Preferred embodiments of the aforementioned connector are described with reference to the drawings.

First Embodiment

A connector 1 of this embodiment includes, as shown in FIGS. 1 to 4, a plurality of first terminals 3A, a first core resin portion 2A, a plurality of second terminals 3B, a second core resin portion 2B, a plurality of third terminals 3C, a third core resin portion 2C and an outer resin portion 4. The first core resin portion 2A covers intermediate parts 33 of the plurality of first terminals 3A excluding both end parts 31A, 32A. The second core resin portion 2B covers intermediate parts 33 of the plurality of second terminals 3B excluding both end parts 31B, 32B. The third core resin portion 2C covers intermediate parts 33 of the plurality of third terminals 3C excluding both end parts 31C, 32C. The outer resin portion 4 partially covers the first, second and third core resin portions 2A, 2B and 2C overlapping each other.

Figure 5:
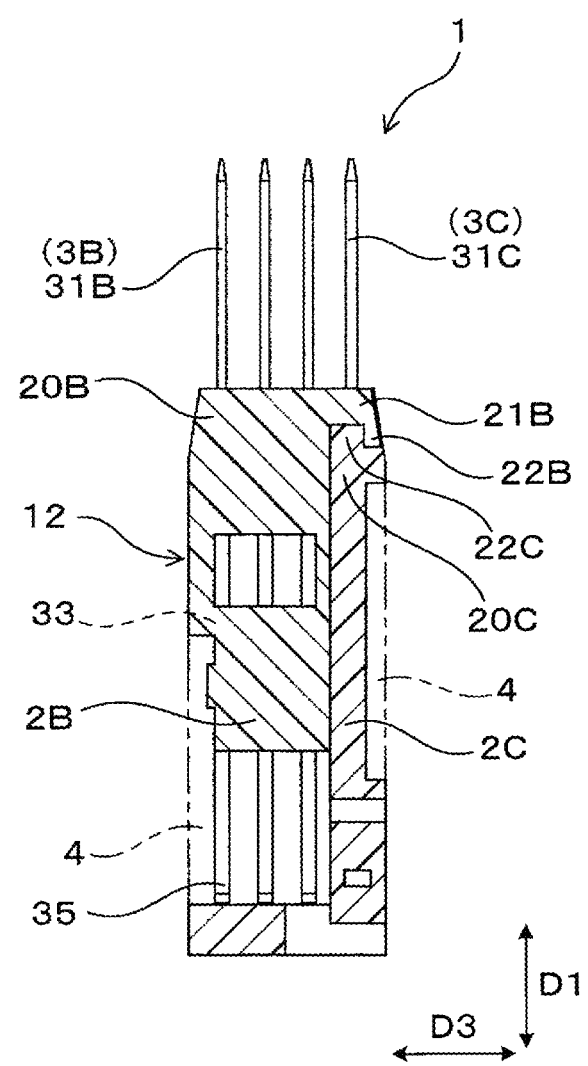
FIG. 5 is a section along V-V of FIG. 2 showing the connector according to the first embodiment.
Figure 6:
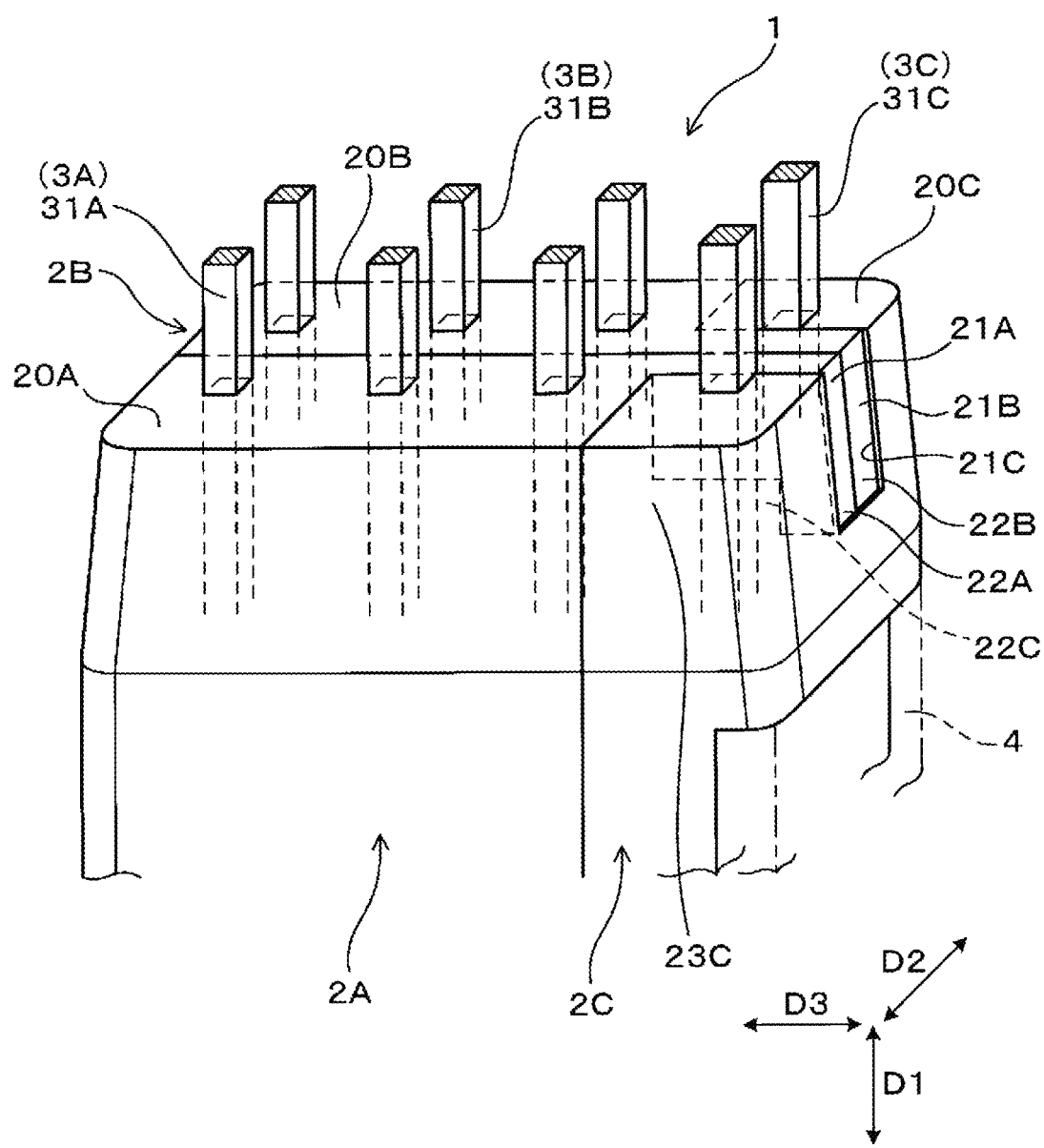
FIG. 6 is a perspective view showing the periphery of one end parts of first to third core resin portions in the connector according to the first embodiment.

As shown in FIGS. 5 and 6, one end parts 31A of the plurality of first terminals 3A, one end parts 31B of the plurality of second terminals 3B and one end parts 31C of the plurality of third terminals 3C are arranged in parallel to each other along a first direction D1. One end part 20A of the first core resin portion 2A from which the one end parts 31A of the plurality of first terminals 3A project, one end part 20B of the second core resin portion 2B from which the one end parts 31B of the plurality of second terminals 3B project, and one end part 20C of the third core resin portion 2C from which the one end parts 31C of the plurality of third terminals 3C project are arranged to overlap each other outside the outer resin portion 4.

Figure 7:
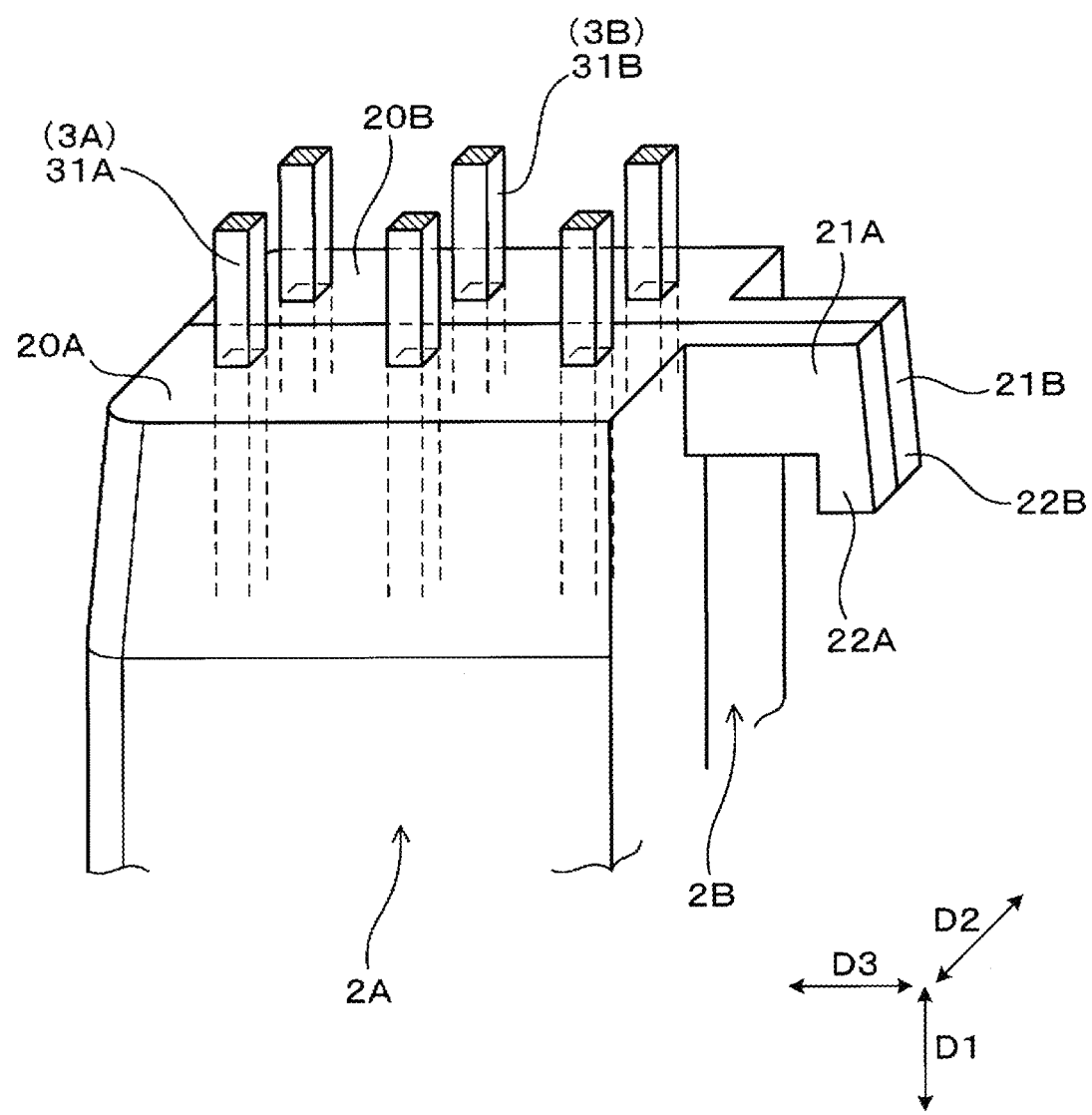
FIG. 7 is a perspective view showing the periphery of the one end parts of the first and second core resin portions in the connector according to the first embodiment.
Figure 8:
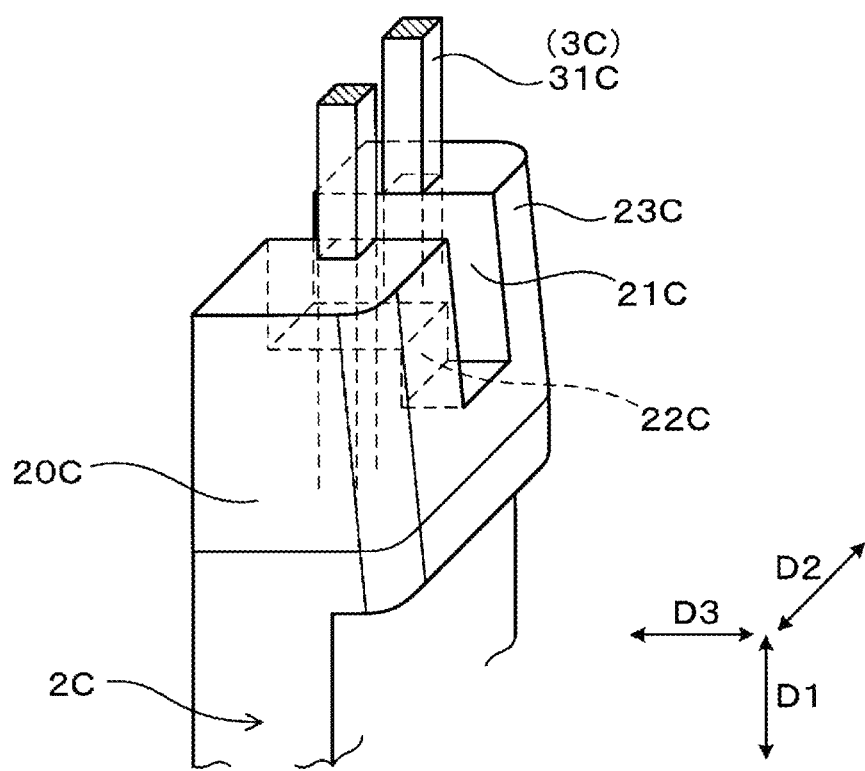
FIG. 8 is a perspective view showing the periphery of the one end part of the third core resin portion in the connector according to the first embodiment.

As shown in FIGS. 6 to 8, the one end part 20A of the first core resin portion 2A and the one end part 20B of the second core resin portion 2B are facing each other in a second direction D2 orthogonal to the first direction D1. The one end part 20C of the third core resin portion 2C sandwiches a part of the one end part 20A of the first core resin portion 2A and a part of the one end part 20B of the second core resin portion 2B from both sides in the second direction D2. The one end part 20A of the first core resin portion 2A and the one end part 20B of the second core resin portion 2B, and the one end part 20C of the third core resin portion 2C are shaped to be locked in a third direction D3 orthogonal to the first and second directions D1, D2.

The connector 1 of this embodiment is described in detail below.

(Connector 1)

Figure 1:
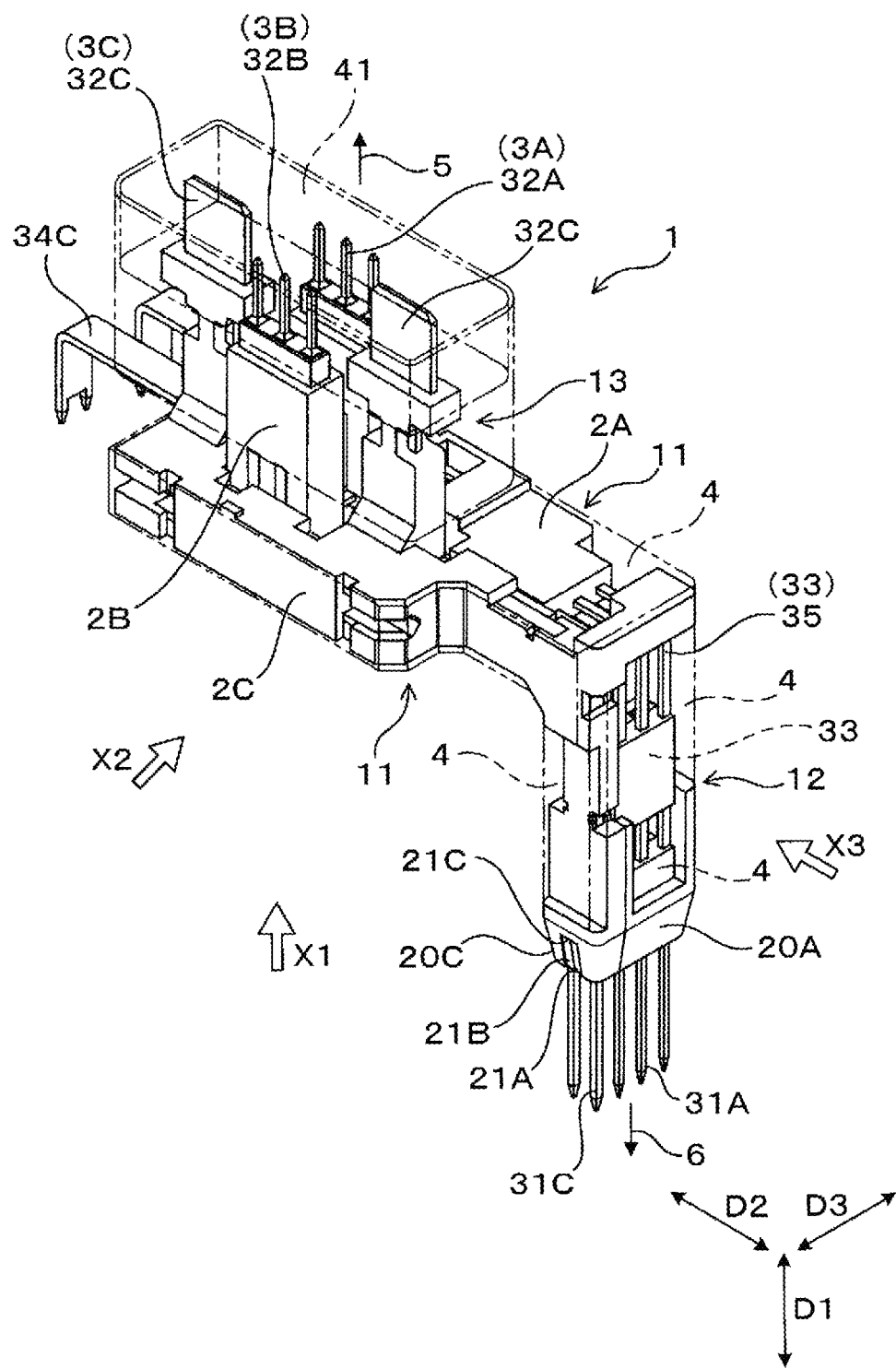
FIG. 1 is a perspective view showing a connector according to a first embodiment.
Figure 2:
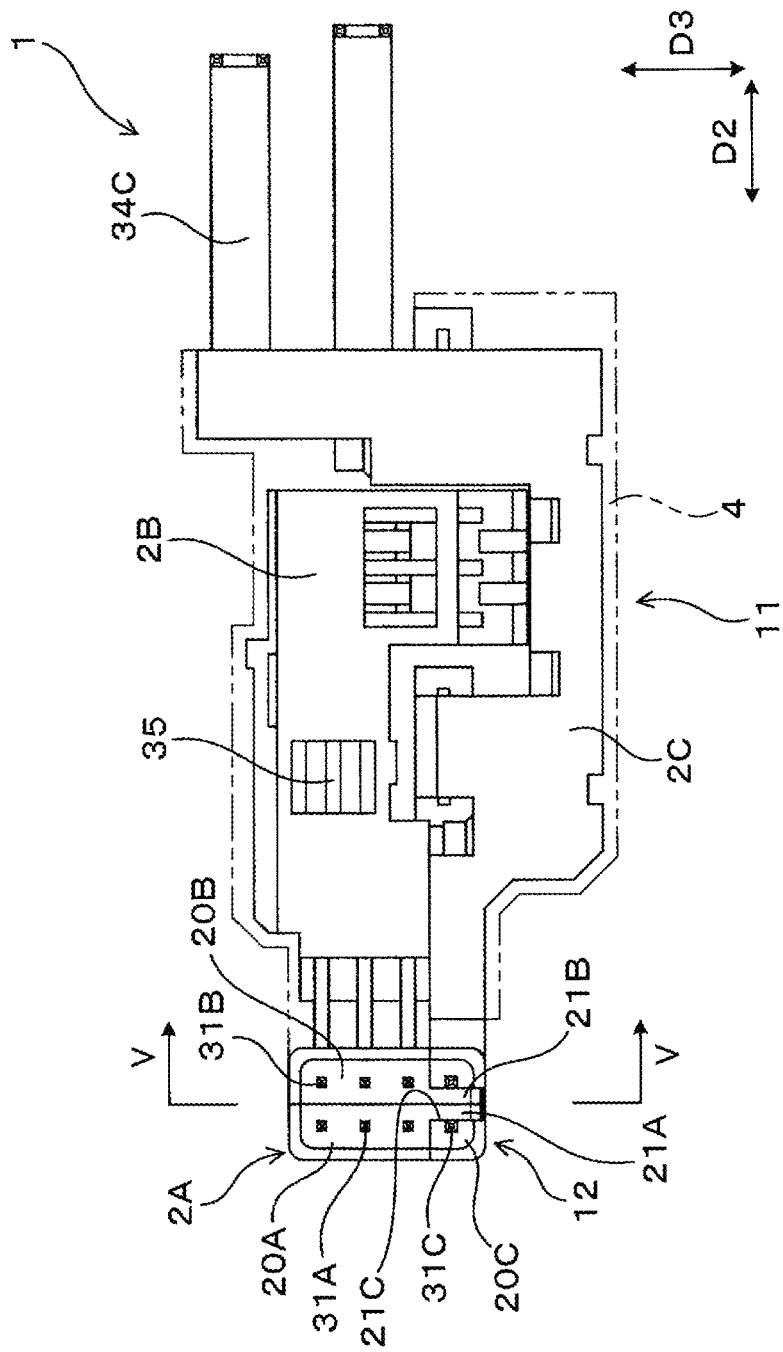
FIG. 2 is an X1 arrow view showing the connector according to the first embodiment.

As shown in FIG. 1, the connector 1 of this embodiment is used as a relay connector for relaying electrical wiring in electrically wiring various control components 5 to a control device. The connector 1 constitutes a male connector in which the respective terminals 3A, 3B and 3C serving as conductor pins are provided. The one end part 31A, 31B, 31C of each terminal 3A, 3B, 3C is connected to a control board 6 of the control device, and the other end part 32A, 32B, 32C of each terminal 3A, 3B, 3C is connected to a female terminal of a female connector.

As shown in FIGS. 2 to 5, each terminal 3A, 3B, 3C may be used either for control or for power supply. The plurality of first terminals 3A and the plurality of second terminals 3B of this embodiment constitute control terminals, and the plurality of third terminals 3C of this embodiment constitute power supply terminals. The other end part 32C of the third terminal 3C is branched into the one end part 31C and another terminal portion 34C.

The plurality of first terminals 3A and the plurality of second terminals 3B are arranged to overlap in two stages in the one end parts 20A, 20B and 20C and partial body parts of the respective core resin portions 2A, 2B and 2C. Further, the plurality of third terminals 3C are arranged to laterally overlap the first terminals 3A and the second terminals 3B in the one end parts 20A, 20B and 20C and partial body parts of the respective core resin portions 2A, 2B and 2C. Note that the body parts of the respective core resin portions 2A, 2B and 2C mean parts of the respective core resin portions 2A, 2B and 2C excluding the one end parts 20A, 20B and 20C.

As shown in FIG. 1, the connector 1 of this embodiment includes a connector base portion 11, a connector projecting portion 12 projecting from the connector base portion 11, and a connector mounting portion 13 projecting from the connector base portion 11. The connector base portion 11 constitutes a body part of the connector 1 arranged to face the control board 6. The connector base portion 11 is a part formed by covering most of the body part of the first core resin portion 2A, the body part of the second core resin portion 2B and the body part of the third core resin portion 2C by the outer resin portion 4.

The connector projecting portion 12 is bent perpendicularly from the connector base portion 11. The connector projecting portion 12 is a part formed to include the one end part 20A of the first core resin portion 2A, the one end part 20B of the second core resin portion 2B and the one end part 20C of the third core resin portion 2C arranged outside the core resin portion 4. The respective core resin portions 2A, 2B and 2C and the outer resin portion 4 are arranged in the connector projecting portion 12. The connector mounting portion 13 is a part formed by covering the other end parts 32A, 32B and 32C of the respective terminals 3A, 3B and 3C by a tubular portion 41 formed by the outer resin portion 4. The female connector is mounted into the connector mounting portion 13.

As shown in FIGS. 1 to 5, in the connector projecting portion 12, the outer resin portion 4 is arranged at a position adjacent to base end sides of the one end part 20A of the first core resin portion 2A, the one end part 20B of the second core resin portion 2B and the one end part 20C of the third core resin portion 2C. Surfaces of the one end parts 20A, 20B and 20C of the respective core resin portions 2A, 2B and 2C are adjacent to a surface of the outer resin portion 4, thereby forming an outer surface of the connector projecting portion 12. The intermediate parts 33 of the respective terminals 3A, 3B and 3C are formed with exposed parts 35 exposed outside the respective core resin portions 2A, 2B and 2C without being covered by the respective core resin portions 2A, 2B and 2C. The exposed parts 35 are covered by the outer resin portion 4.

Since the outer resin portion 4 is arranged adjacent to the base end sides of the one end parts 20A, 20B and 20C of the respective core resin portions 2A, 2B and 2C, a contraction force generated in molding a resin material for constituting the outer resin portion 4 easily acts on the one end parts 20A, 20B and 20C of the respective core resin portions 2A, 2B and 2C.

Figure 3:
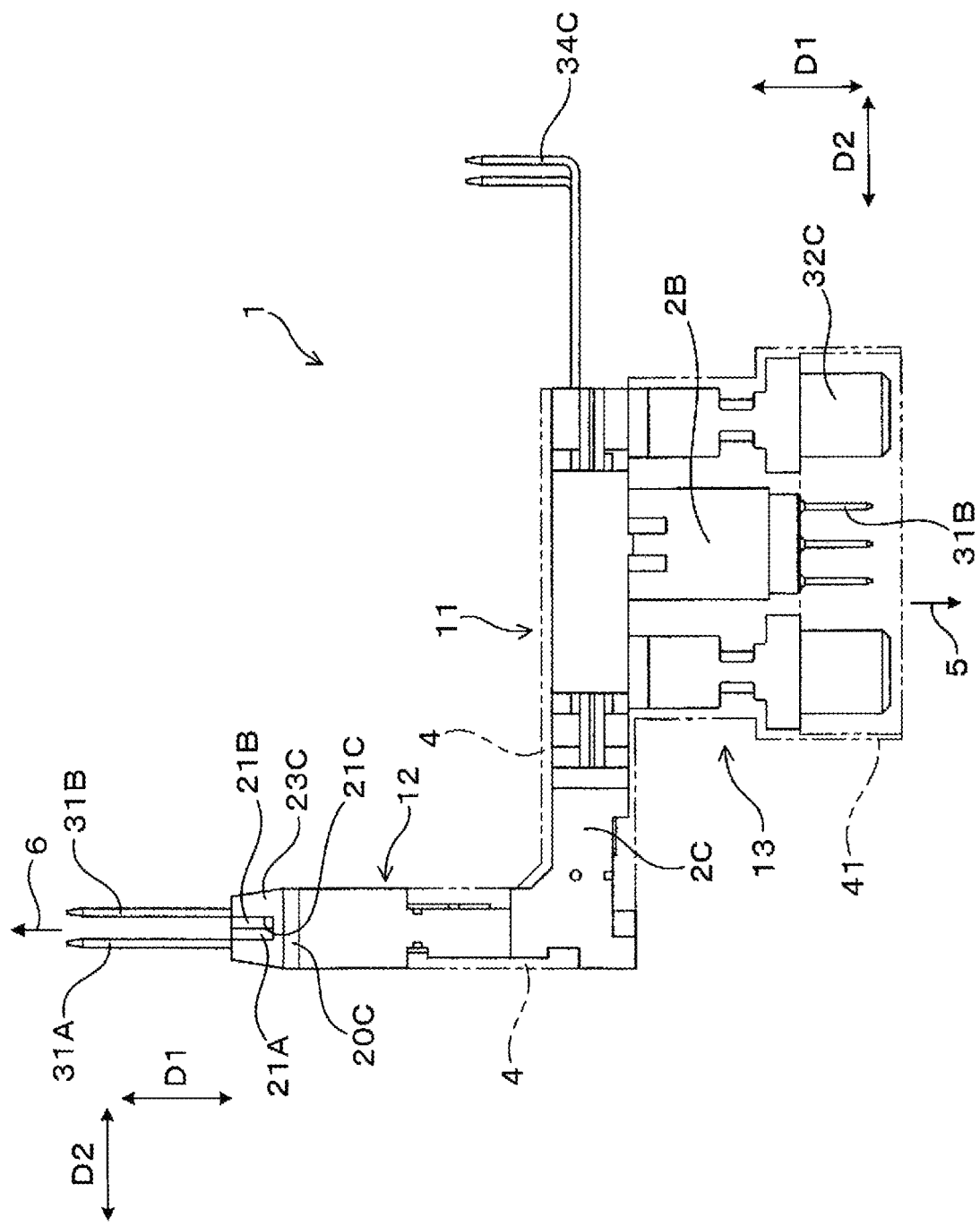
FIG. 3 is an X2 arrow view showing the connector according to the first embodiment.
Figure 4:
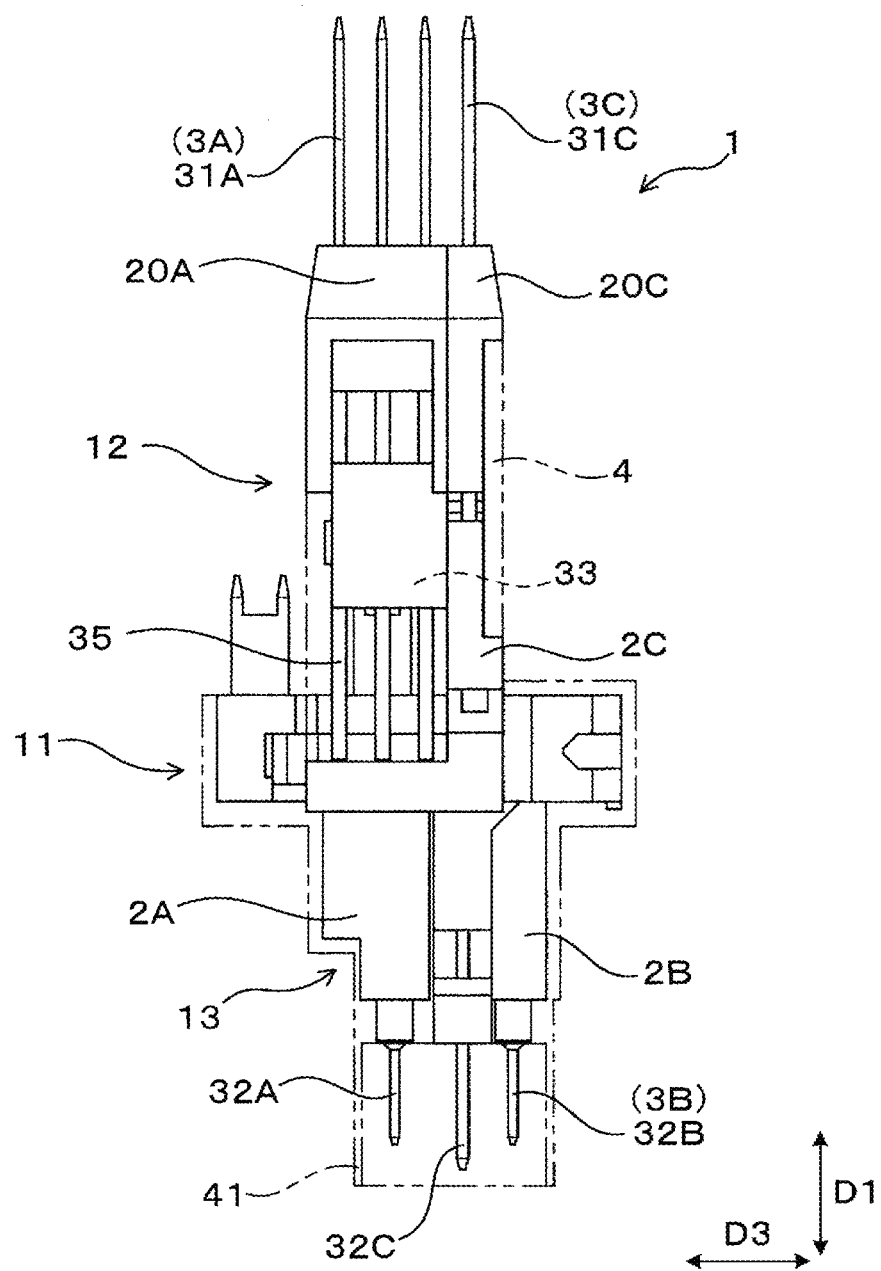
FIG. 4 is an X3 arrow view showing the connector according to the first embodiment.

As shown in FIGS. 1 and 3, the respective terminals 3A, 3B and 3C are bent into a crank shape according to the shapes of the connector base portion 11, the connector projecting portion 12 and the connector mounting portion 13. The one end parts 31A, 31B and 31C of the respective terminals 3A, 3B and 3C are arranged to project toward one side from the connector base portion 11. The other end parts 32A, 32B and 32C of the respective terminals 3A, 3B and 3C are arranged to project toward the other side from the connector base portion 11.

(Core Resin Portions 2A, 2B and 2C and Outer Resin Portion 4)

Each core resin portion 2A, 2B, 2C is formed by insert molding with the respective terminals 3A, 3B, 3C arranged inside. Further, each core resin portion 2A, 2B, 2C is separately molded. The first core resin portion 2A is formed by arranging the plurality of first terminals 3A in a mold and insert-molding a resin material in the mold. The second core resin portion 2B is formed by arranging the plurality of second terminals 3B in a mold and insert-molding a resin material in the mold. The third core resin portion 2C is formed by arranging the plurality of third terminals 3C in a mold and insert-molding a resin material in the mold. In this way, each core resin portion 2A, 2B, 2C is formed as a primary molded article with the respective terminals 3C, 3B, 3C inserted.

The connector 1 is formed by arranging the respective core resin portions 2A, 2B and 2C in a mold and insert-molding the resin material for constituting the outer resin portion 4 in the mold. The outer resin portion 4 is formed as a secondary molded article with the respective core resin portions 2A, 2B and 2C inserted.

(Configurations of One End Parts 31A, 31B and 31C of Terminals 3A, 3B and 3C and One End Parts 20A, 20B and 20C of Core Resin Portions 2A, 2B and 2C)

As shown in FIGS. 1 and 6, the first, second and third directions D1, D2 and D3 are used for convenience to indicate directions in the one end parts 31A, 31B and 31C of the respective terminals 3A, 3B and 3C and the one end parts 20A, 20B and 20C of the respective core resin portions 2A, 2B and 2C. The first direction D1 indicates an extending direction of the one end parts 31A, 31B and 31C of the respective terminals 3A, 3B and 3C and is set as a direction perpendicular to the connector base portion 11 of the connector 1 in which the body parts of the respective terminals 3A, 3B and 3C are arranged. The second and third directions D2, D3 are set as directions parallel to the connector base portion 11 of the connector 1. Further, in the first direction D1, a side toward which the one end parts 31A, 31B and 31C of the respective terminals 3A, 3B and 3C project from the respective core resin portions 2A, 2B and 2C is referred to as a tip side and a side opposite to the tip side in the first direction D1 is referred to as a base end side.

As shown in FIGS. 6 and 7, the one end parts 31A of the plurality of first terminals 3A and the one end parts 31B of the plurality of second terminals 3B are respectively aligned and arranged in one stage along the third direction D3. In this embodiment, three first terminals 3A and three second terminals 3B are arranged side by side. The plurality of first terminals 3A and the plurality of second terminals 3B are facing each other in the second direction D2 and arranged to overlap in two stages in the second direction D2.

Further, as shown in FIGS. 6 and 8, a plurality of the one end parts 31C of the plurality of third terminals 3C are adjacent to the one end parts 31A of the first terminals 3A and the one end parts 31B of the second terminal 3B in the third direction D3, and aligned and arranged along the second direction D2. In other words, the one end parts 31C of the plurality of third terminals 3C are arranged side by side in the second direction D2 and also arranged side by side with the first terminals 3A and the second terminals 3B in the third direction D3. In this embodiment, two third terminals 3C are aligned in conformity to the alignment of the first terminals 3A and the second terminals 3B overlapping in two stages.

The one end part 20A of the first core resin portion 2A covering the plurality of first terminals 3A and the one end part 20B of the second core resin portion 2B covering the plurality of second terminals 3B are joined side by side in the second direction D2. Further, the one end part 20C of the third core resin portion 2C covering the plurality of third terminals 3C is joined side by side with the one end part 20A of the first core resin portion 2A and the one end part 20B of the second core resin portion 2B in the third direction D3.

As shown in FIGS. 6 and 8, a recess 21 recessed toward the base end side in the first direction D1 is formed between the third terminals 3C in a central part of the one end part 20C of the third core resin portion 2C in the second direction D2. A forked portion 23C forked toward the tip side in the first direction D1 is formed in the one end part 20C of the third core resin portion 2C by forming the recess 21C.

The one end part 20A of the first core resin portion 2A is formed with a first projecting portion 21A projecting in the third direction D3 and arranged in the recess 21C. The one end part 20B of the second core resin portion 2B is formed with a second projecting portion 21B projecting in the third direction D3 and arranged in the recess 21C. The first and second projecting portions 21A, 21B are sandwiched in the second direction D2 by the forked portion 23C. The recess 21C of this embodiment is formed up to the positions of side surfaces of the third terminals 3C to make thicknesses of the first and second projecting portions 21A, 21B in the second direction D2 as large as possible.

As shown in FIGS. 6 to 8, a part of the first projecting portion 21A and a part of the second projecting portion 21B, and a part forming the recess 21C in the one end part 20C of the third core resin portion 2C are shaped to be locked in the third direction D3 so as not to be shifted in position in the third direction D3. More specifically, an end part of the first projecting portion 21A and an end part of the second projecting portion 21B are formed with locking portions 22A, 22B projecting toward the base end side in the first direction D1.

A locked portion 22C facing the respective locking portions 22A, 22B in the third direction D3 is formed in a part forming the bottom surface of the recess 21C in the one end part 20C of the third core resin portion 2C. The bottom surface of the recess 21C has a step shape in the third direction D3 to form the locked portion 22C. The first and second projecting portions 21A, 21B are formed into a hook shape in the third direction D3 to form the respective locking portions 22A, 22B.

The first to third terminals 3A, 3B and 3C are made of a metal material excellent in conductivity. The first to third core resin portions 2A, 2B and 2C and the outer resin portion 4 are made of thermoplastic resin excellent in moldability such as in injection molding or the like.

(Assembling Method)

A worker or the like first combines the first and second core resin portions 2A, 2B as shown in FIG. 7 when the three first to third core resin portions 2A, 2B and 2C are combined. At this time, the one end part 20A of the first core resin portion 2A and the one end part 20B of the second core resin portion 2B are facing each other in the second direction D2. Subsequently, as shown in FIGS. 7 and 8, the worker or the like relatively slides the one end part 20C of the third core resin portion 2C toward the tip side in the first direction D1 with respect to the one end part 20A of the first core resin portion 2A and the one end part 20B of the second core resin portion 2B. At this time, as shown in FIG. 6, the first projecting portion 21A of the first core resin portion 2A and the second projecting portion 21B of the second core resin portion 2B are inserted into the recess 21 of the third core resin portion 2C.

(Functions and Effects)

In the connector 1 of this embodiment, when the one end parts 20A, 20B and 20C of the three core resin portions 2A, 2B and 2C are arranged to overlap each other outside the outer resin portion 4, the one end parts 20A, 20B and 20C of these three core resin portions 2A, 2B and 2C are prevented from being separated from each other.

In this embodiment, the forked portion 23C in the one end part 20C of the third core resin portion 2C sandwiches the first projecting portion 21A of the one end part 20A of the first core resin portion 2A and the second projecting portion 21B of the one end part 20B of the second core resin portion 2B facing each other in the second direction D2 from both sides in the second direction D2. In this way, the one end part 20A of the first core resin portion 2A and the one end part 20B of the second core resin portion 2B cannot be separated from each other in the second direction D2.

Even if a stress generated when the resin material for constituting the outer resin portion 4 is cooled to contract acts on the one end parts 20A, 20B and 20C of the respective core resin portions 2A, 2B and 2C in insert-molding the outer resin portion 4 in the mold with the respective core resin portions 2A, 2B and 2C inserted in the mold, the one end part 20A of the first core resin portion 2A and the one end part 20B of the second core resin portion 2B cannot be separated from each other in the second direction D2. Particularly, after the molded connector 1 is taken out from the mold, a positional relationship of the one end part 20A of the first core resin portion 2A and the one end part 20B of the second core resin portion 2B in the second direction D2 is maintained.

Further, the locking portion 22A of the first projecting portion 21B and the locking portion 22B of the second projecting portion 21B are locked in the third direction D3 by the locked portion 22C forming the bottom surface of the recess 21C of the third core resin portion 3C. In this way, the one end part 20A of the first core resin portion 2A and the one end part 20B of the second core resin portion 2B, and the one end part 30C of the third core resin portion 2C cannot be separated from each other in the third direction D3.

Even if a stress generated when the resin material for constituting the outer resin portion 4 is cooled to contract acts on the one end parts 20A, 20B and 20C of the respective core resin portions 2A, 2B and 2C in insert-molding the outer resin portion 4 in the mold with the respective core resin portions 2A, 2B and 2C inserted in the mold, the one end part 20A of the first core resin portion 2A and the one end part 20B of the second core resin portion 2B, and the one end part 20C of the third core resin portion 2C cannot be separated from each other in the third direction D3. Particularly, after the molded connector 1 is taken out from the mold, a positional relationship of the one end part 20A of the first core resin portion 2A and the one end part 20B of the second core resin portion 2B, and the one end part 20C of the third core resin portion 2C in the third direction D3 is maintained.

As just described, in the connector 1 of this embodiment, a variation in the position of the one end part 31A, 31B, 31C of each terminal 3A, 3B, 3C can be prevented by preventing the one end parts 20A, 20B and 20C of the respective core resin portions 2A, 2B and 2C arranged outside the outer resin portion 4 from being separated from each other in molding the outer resin portion 4 with the respective core resin portions 2A, 2B and 2C inserted.

Therefore, according to the connector 1 of this embodiment, even if the one end parts 20A, 20B and 20C of the three core resin portions 2A, 2B and 2C are arranged to overlap each other outside the outer resin portion 4, it is possible to prevent a variation in the position of the one end part 31A, 31B, 31C of each terminal 3A, 3B, 3C projecting from the one end part 20A, 20B, 20C of each core resin portion 2A, 2B, 2C.

Second Embodiment

Figure 9:
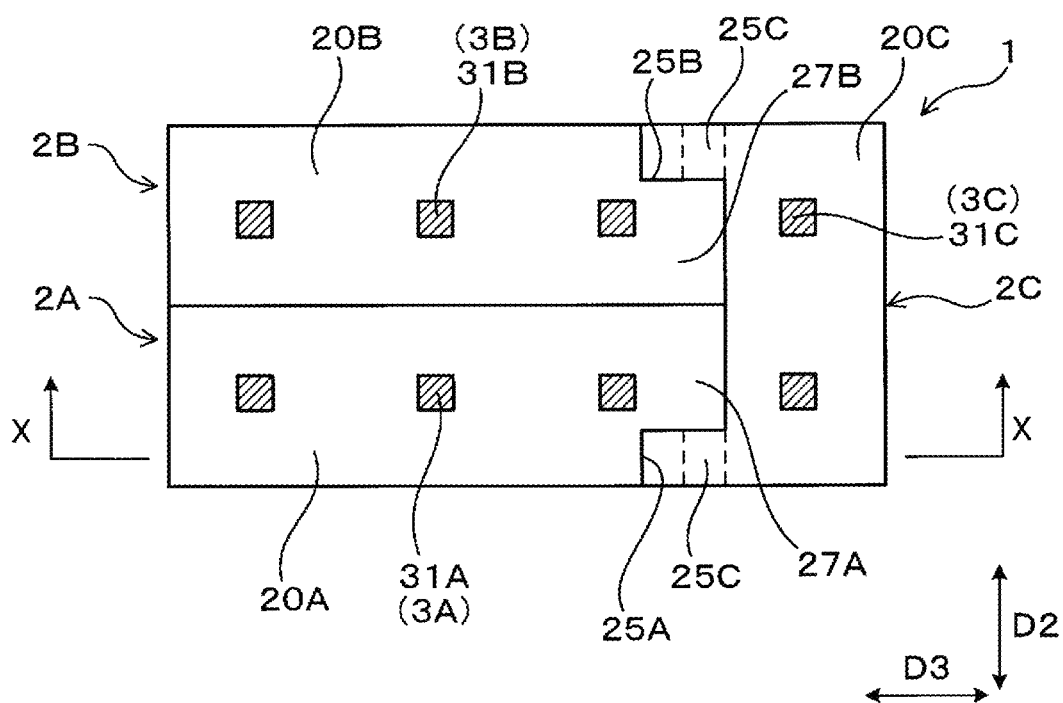
FIG. 9 is a diagram showing the periphery of one end parts of first to third core resin portions in a connector according to a second embodiment.
Figure 10:
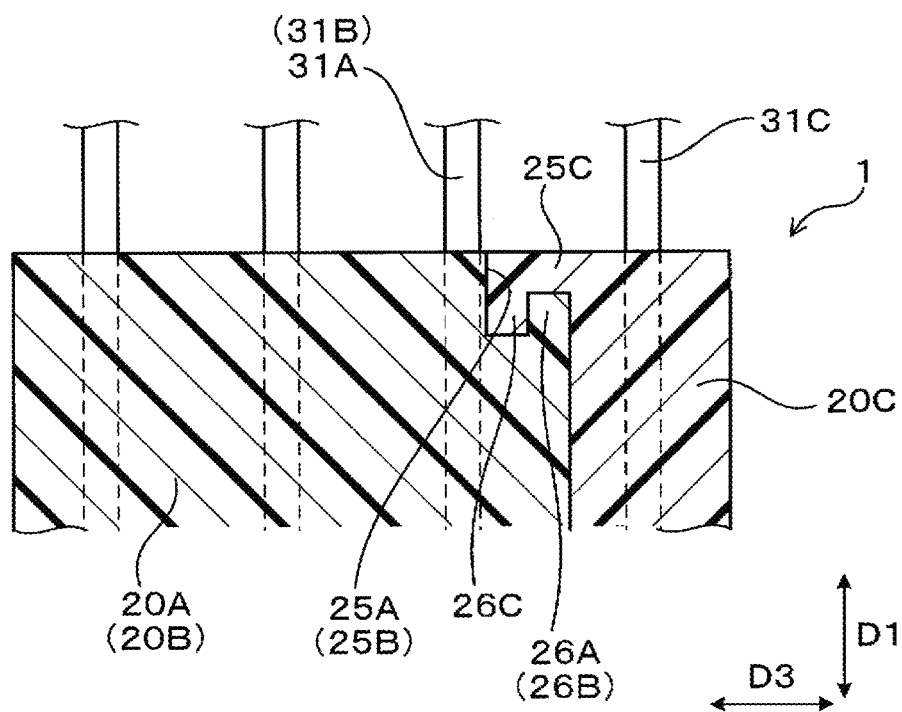
FIG. 10 is a section along X-X of FIG. 9 showing the periphery of the one end parts of the first to third core resin portions in the connector according to the second embodiment.

In this embodiment, how to combine one end parts 20A, 20B and 20C of core resin portions 2A, 2B and 2C is different from that in the connector 1 shown in the first embodiment. As shown in FIGS. 9 and 10, recesses 25A, 25B recessed toward the base end side in the first direction D1 are respectively formed in outer parts in the second direction D2 of the one end part 20A of the first core resin portion 2A and the one end part 20B of the second core resin portion 2B of this embodiment. Further, a pair of third projecting portions 25C projecting in the third direction D3 and arranged in the respective recesses 25A, 25B are formed on both side parts in the second direction D2 in the one end part 20C of the third core resin portion 2C.

Projections 27A, 27B to be sandwiched in the second direction by the pair of third projecting portions 25C are formed on central parts in the second direction D2 in the one end part 20A of the first core resin portion 2A and the one end part 20B of the second core resin portion 2B. Parts forming the respective recesses 25A, 25B in the one end part 20A of the first core resin portion 2A and the one end part 20B of the second core resin portion 2B and parts of the third projecting portions 25C are shaped to be locked in the third direction D3. More specifically, locking portions 26C projecting toward the base end side in the first direction D1 are formed on end parts of the pair of third projecting portions 25C.

A locked portion 26A facing the locking portion 26C in the third direction D3 is formed in a part forming the bottom surface of the recess 25A in the one end part 20A of the first core resin portion 2A. A locked portion 26B facing the locking portion 26C in the third direction D3 is formed in a part forming the bottom surface of the recess 25B in the one end part 20B of the second core resin portion 2B. The bottom surfaces of the respective recesses 25A, 25B have a step shape in the third direction D3 to form the locked portions 26A, 26B. The third projecting portions 25C are formed into a hook shape in the third direction D3 to form the locking portions 26C.

The other configurations, functions, effects and the like of the connector 1 of this embodiment are similar to those of the first embodiment. Further, also in this embodiment, constituent elements denoted by the same reference signs as in the first embodiment are similar to those of the first embodiment.

Third Embodiment

Figure 11:
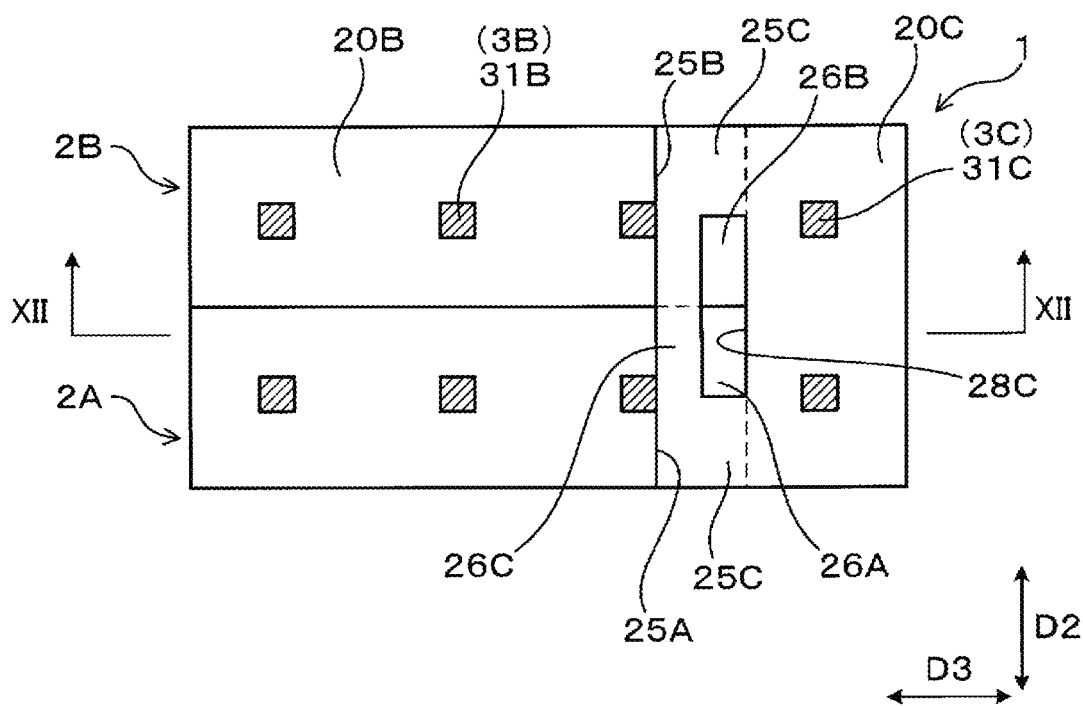
FIG. 11 is a diagram showing the periphery of one end parts of first to third core resin portions in a connector according to a third embodiment.
Figure 12:
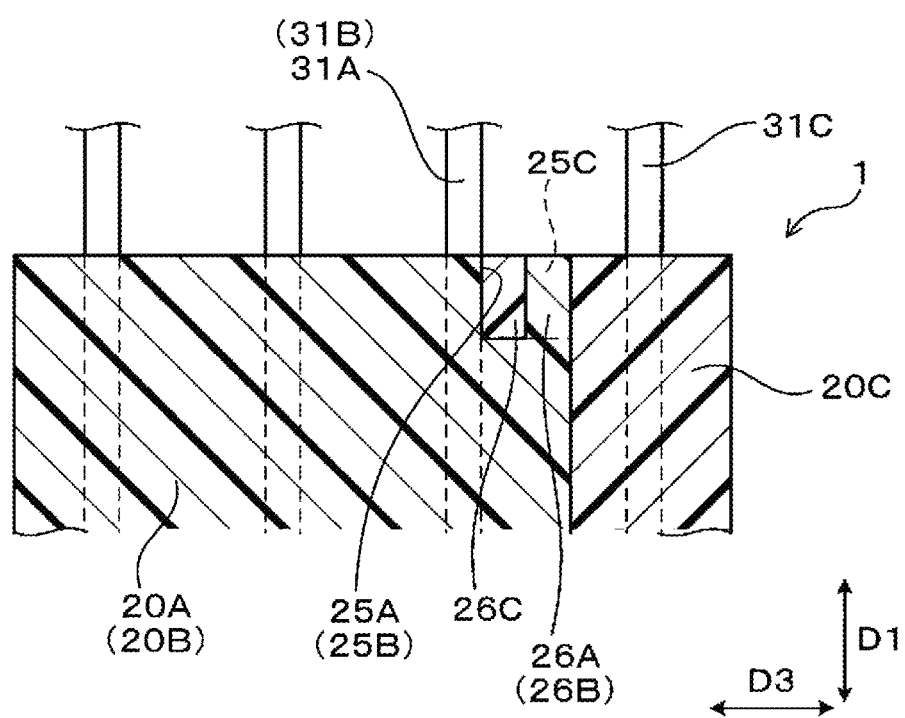
FIG. 12 is a section along XII-XII of FIG. 11 showing the periphery of the one end parts of the first to third core resin portions in the connector according to the third embodiment.

In this embodiment, how to combine one end parts 20A, 20B and 20C of core resin portions 2A, 2B and 2C is different from those in the connectors 1 shown in the first and second embodiments. As shown in FIGS. 11 and 12, a pair of third projecting portions 25C formed on both side parts in the second direction D2 of the one end part 20C of the third core resin portion 2C of this embodiment are linked by a locking portion 26C to form an annular shape. The one end part 20A of the first core resin portion 2A and the one end part 20B of the second core resin portion 2B of this embodiment are formed with recesses 25A, 25B recessed toward the base end side in the first direction D1 and locked portions 26A, 26B projecting toward the tip side in the first direction D1 in the recesses 25A, 25B and serving as projections to be locked by the locking portions 26C.

The pair of third projecting portions 25C and the locking portion 26C are arranged in the recesses 25A, 25B. Further, the locked portions 26A, 26B serving as the projections are arranged in a hole portion 28C enclosed by the one end part 20C, the pair of third projecting portions 25C and the locking portion 26C.

The other configurations, functions, effects and the like of the connector 1 of this embodiment are similar to those of the first embodiment. Further, also in this embodiment, constituent elements denoted by the same reference signs as in the first embodiment are similar to those of the first embodiment.

Fourth Embodiment

Also in this embodiment, how to combine one end parts 20A, 20B and 20C of core resin portions 2A, 2B and 2C is different from those in the connectors 1 shown in the first to third embodiments.

Figure 13:
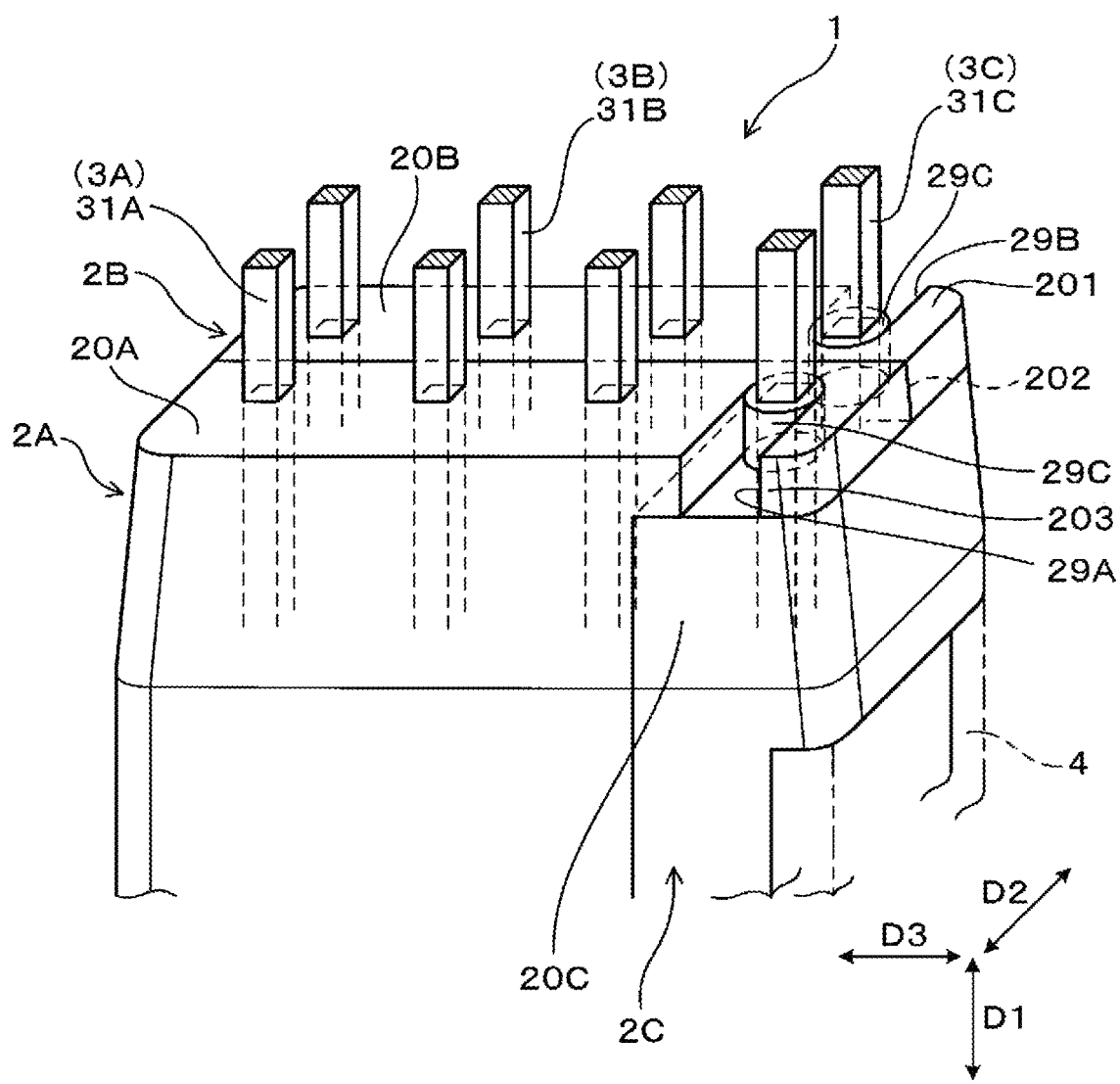
FIG. 13 is a perspective view showing the periphery of one end parts of first to third core resin portions in a connector according to a fourth embodiment.

As shown in FIG. 13, a plurality of one end parts 31A of first terminals 3A and a plurality of one end parts 31B of second terminals 3B of this embodiment are also aligned and arranged along the third direction D3. Further, a plurality of one end parts 31C of third terminals 3C of this embodiment are also adjacent to the one end parts 31A of the first terminals 3A and the one end parts 31B of the second terminals 3B, and aligned and arranged along the second direction D2.

In this embodiment, the one end part 20A of the first core resin portion 2A and the one end part 20B of the second core resin portion 2B are respectively formed with overlapping portions 201 overlapping the one end part 20C of the third core resin portion 2C from the tip side in the first direction D1. The overlapping portions 201 are parts to be locked in the second and third directions D2, D3 by the one end part 20C of the third core resin portion 20C in the one end part 20A of the first core resin portion 2A and the one end part 20B of the second core resin portion 2B. The one end part 20C of the third core resin portion 2C is shaped to engage the respective overlapping portions 201 of the one end part 20A of the first core resin portion and the one end part 20B of the second core resin portion 2B.

Figure 14:
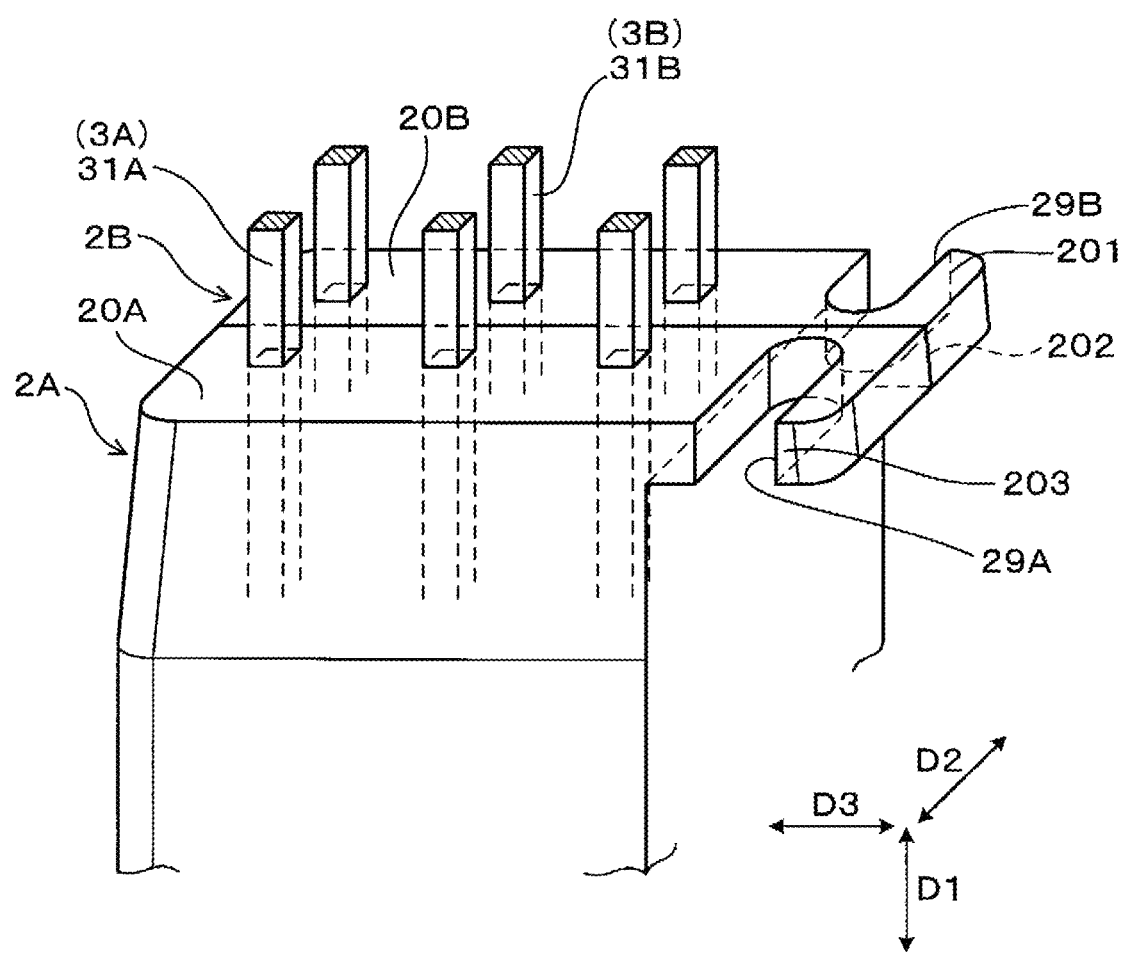
FIG. 14 is a perspective view showing the periphery of the one end parts of the first and second core resin portions in the connector according to the fourth embodiment.

As shown in FIG. 14, the respective overlapping portions 201 of the one end part 20A of the first core resin portion 2A and the one end part 20B of the second core resin portion 2B are formed with cutout grooves 29A, 29B cut from outer side end surfaces 203 in the second direction D2 to penetrate in the first direction D1. The cutout grooves 29A, 29B are formed in the side end surfaces 203 located on sides opposite to facing surfaces 202 at which the one end part 20A of the first core resin portion 2A and the one end part 20B of the second core resin portion 2B are joined in the second direction D2.

Figure 15:
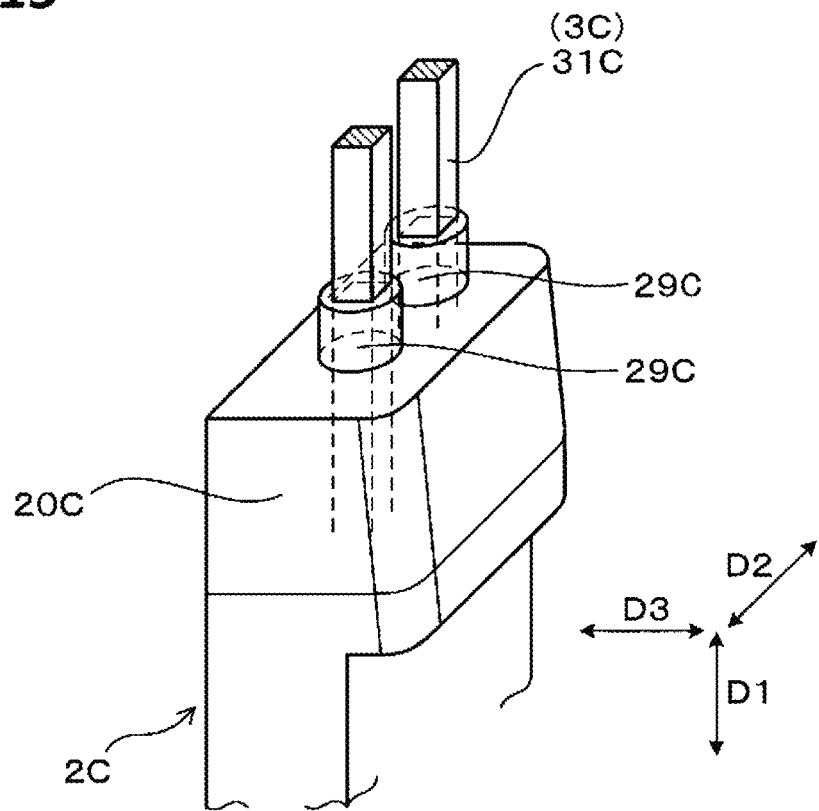
FIG. 15 is a perspective view showing the periphery of the one end part of the third core resin portion in the connector according to the fourth embodiment.

As shown in FIGS. 13 and 15, the one end part 20C of the third core resin portion 2C is formed with fitting portions 29C projecting toward the tip side in the first direction D1 and fit into the cutout grooves 29A, 29B. A pair of the fitting portions 29C are formed side by side on both sides in the second direction D2 in the one end part 20C of the third core resin portion 2C. The fitting portions 29C of this embodiment are formed into a cylindrical shape. The fitting portions 29C can be formed into various shapes according to the shape of the cutout grooves 29A, 29B or through holes. The fitting portions 29C may be, for example, formed at positions including the both side end surfaces 203 in the second direction D2 in the one end part 20C of the third core resin portion 2C.

Cross-sectional shapes of the cutout grooves 29A, 29B orthogonal to the first direction D1 are constant in the first direction so that the fitting portions 29C are slid and fit in the first direction D1. The cutout grooves 29A, 299B are formed in parallel to the first direction D1, and wall surfaces constituting the cutout grooves 29A, 29B are parallel to the first direction D1.

Note that the cutout grooves 29A, 29B and the fitting portions 29C can also be formed by tapered wall surfaces to gradually reduce widths thereof toward the tip side in the first direction D1. In this case, the fitting portions 29C are easily fit into the cutout grooves 29A, 29B.

The pair of fitting portions 29C on the one end part 20C of the third core resin portion 2C include the one to be fit into the cutout groove 29A in the one end part 20A of the first core resin portion and the one to be fit into the cutout groove 29B in the one end part 20B of the second core resin portion 2B. In this embodiment, the pair of fitting portions 29 are formed side by side along the second direction D2.

The third terminals 3C of this embodiment are formed to penetrate through the fitting portions 29C of the third core resin portion 2C in the first direction D1. In other words, the fitting portions 29C are formed to surround the third terminals 3C with the third terminals 3C arranged in centers. Note that the fitting portions 29C can also be formed at positions where the third terminals 3C are not arranged. In this case, insertion holes through which the third terminals 3C are inserted can be formed in the overlapping portions 201.

As shown in FIG. 13, the one end part 20C of the third core resin portion 2C is joined with the respective overlapping portions 201 of the one end part 20A of the first core resin portion 2A and the one end part 20B of the second core resin portion 2B from the base end side in the first direction D1. The fitting portions 29C of the one end part 20C of the third core resin portion 2C are fit into the cutout grooves 29A, 29B of the respective overlapping portions 201 in the one end part 20A of the first core resin portion 2A and the one end part 20B of the second core resin portion 2B from the base end side in the first direction D1.

If the fitting portion 29C on the one end part 20C of the third core resin portion 2C is fit into the cutout groove 29A of the one end part 20A of the first core resin portion 2A, the one end part 20A of the first core resin portion 2A can be no longer shifted in position in the second and third directions D2, D3 with respect to the one end part 20C of the third core resin portion 2C. Further, if the fitting portion 29C on the one end part 20C of the third core resin portion 2C is fit into the cutout groove 29B of the one end part 20B of the second core resin portion 2B, the one end part 20B of the second core resin portion 2B can be no longer shifted in position in the second and third directions D2, D3 with respect to the one end part 20C of the third core resin portion 2C.

The one end part 20A of the first core resin portion 2A and the one end part 20B of the second core resin portion 2B are sandwiched in the second direction D2 by the fitting portions 29C of the one end part 20C of the third core resin portion 2C. In this way, even if a stress generated when a resin material for constituting an outer resin portion 4 is cooled to contract acts on the one end parts 20A, 20B and 20C of the respective core resin portions 2A, 2B and 2C in insert-molding the outer resin portion 4 with the respective core resin portions 2A, 2B and 2C inserted, the one end part 20A of the first core resin portion 2A and the one end part 20B of the second core resin portion 2B can be prevented from being separated from each other in the second direction D2.

Further, the one end part 20A of the first core resin portion 2A and the one end part 20B of the second core resin portion 2B are locked in the third direction D3 by the fitting portions 29C of the one end part 20C of the third core resin portion 2C. In this way, even if a stress generated when the resin material for constituting the outer resin portion 4 is cooled to contract acts on the one end parts 20A, 20B and 20C of the respective core resin portions 2A, 2B and 2C in insert-molding the outer resin portion 4 with the respective core resin portions 2A, 2B and 2C inserted, the one end part 20A of the first core resin portion 2A and the one end part 20B of the second core resin portion 2B, and the one end part 20C of the third core resin portion 2C can be prevented from being separated from each other in the third direction D3.

Also in the connector 1 of this embodiment, a variation in the position of the one end part 31A, 31B, 31C of each terminal 3A, 3B, 3C can be prevented by preventing the one end parts 20A, 20B and 20C of the respective core resin portions 2A, 2B and 2C arranged outside the outer resin portion 4 from being separated from each other when the outer resin portion 4 molded with the respective core resin portions 2A, 2B and 2C inserted contracts.

Figure 16:
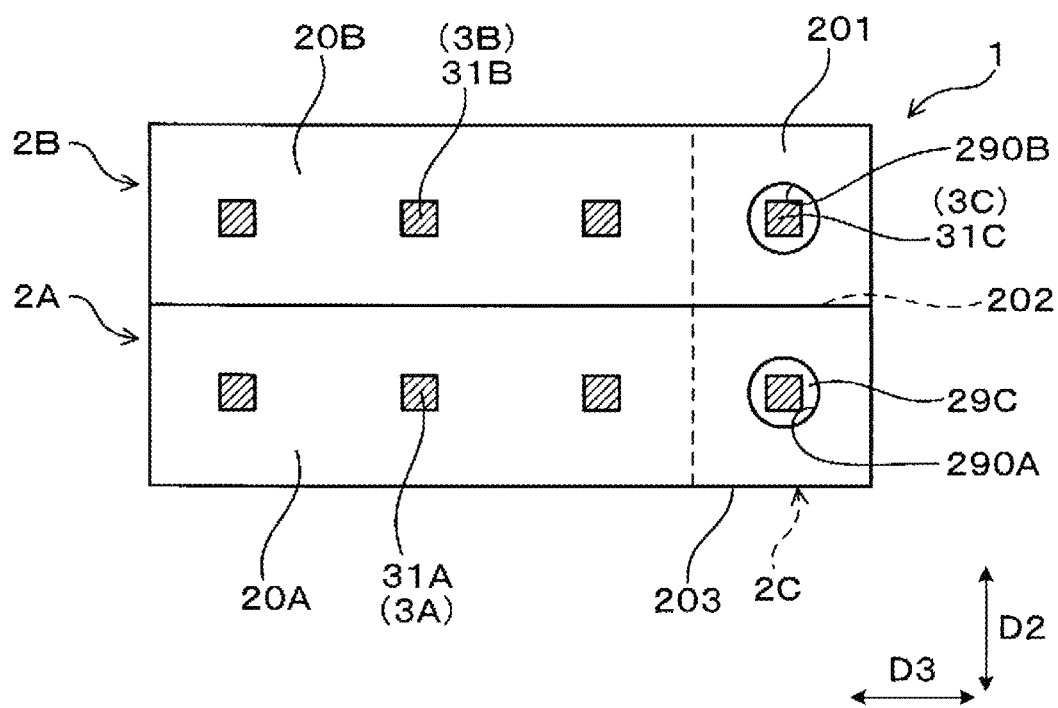
FIG. 16 is a diagram showing the periphery of the one end parts of the first to third core resin portions in the connector according to the fourth embodiment.

Further, as shown in FIG. 16, the respective overlapping portions 201 of the one end part 20A of the first core resin portion 2A and the one end part 20B of the second core resin portion 2B can also be formed with through holes 290A, 290B penetrating in the first direction D1 instead of the cutout grooves 29A, 29B. Also in this case, functions and effects similar to those in the case of forming the cutout grooves 29A, 29B can be obtained.

The other configurations, functions, effects and the like of the connector 1 of this embodiment are similar to those of the first embodiment. Further, also in this embodiment, constituent elements denoted by the same reference signs as in the first embodiment are similar to those of the first embodiment.

The present invention is not limited only to the respective embodiments and different embodiments can be configured without departing from the gist of the present invention. The one end parts 20A, 20B and 20C of the respective core resin portions 2A, 2B and 2C can be formed into such various shapes that the one end parts 20A, 20B and 20C face each other. Further, the connector 1 may cover two, four or more core resin portions by the outer resin portion 4.

What is claimed is:

1. A connector, comprising:
 a first terminal;
 a first core resin portion for covering an intermediate part of the first terminal excluding both end parts;
 a second terminal;
 a second core resin portion for covering an intermediate part of the second terminal excluding both end parts;

a third terminal;

a third core resin portion for covering an intermediate part of the third terminal excluding both end parts; and an outer resin portion for partially covering the first core resin portion, the second core resin portion and the third core resin portion overlapping each other, wherein:

one end part of the first terminal, one end part of the second terminal and one end part of the third terminal are arranged in parallel to each other along a first direction, one end part of the first core resin portion from which the one end part of the first terminal projects, one end part of the second core resin portion from which the one end part of the second terminal projects and one end part of the third core resin portion from which the one end part of the third terminal projects are arranged to overlap each other outside the outer resin portion, the one end part of the first core resin portion and the one end part of the second core resin portion are facing each other in a second direction orthogonal to the first direction, the one end part of the third core resin portion sandwiches at least a part of the one end part of the first core resin portion and a part of the one end part of the second core resin portion from both sides in the second direction, and the one end part of the first core resin portion and the one end part of the second core resin portion, and the one end part of the third core resin portion are shaped to be locked in a third direction orthogonal to the first and second directions.

2. The connector of claim 1, wherein the outer resin portion is arranged at a position adjacent to base end sides of the one end part of the first core resin portion, the one end part of the second core resin portion and the one end part of the third core resin portion.

3. The connector of claim 1, comprising:

a connector base portion, an intermediate part of the first core resin portion, an intermediate part of the second core resin portion and an intermediate part of the third core resin portion being covered by the outer resin portion in the connector base portion; and a connector projecting portion bent from the connector base portion, arranged outside the outer resin portion and including the one end part of the first core resin portion, the one end part of the second core resin portion and the one end part of the third core resin portion.

4. The connector of claim 1, wherein:

the one end parts of a plurality of the first terminals and the one end parts of a plurality of the second terminals are aligned and arranged along the third direction, the one end parts of a plurality of the third terminals are adjacent to the one end parts of the first terminals and the one end parts of the second terminals in the third direction and aligned and arranged along the second direction, a recess recessed toward a base end side in the first direction is formed in a central part in the second direction of the one end part of the third core resin portion, the one end part of the first core resin portion and the one end part of the second core resin portion are formed with a first projecting portion and a second projecting portion projecting in the third direction and arranged in the recess, and a part of the first projecting portion and a part of the second projecting portion, and a part forming the recess in the one end part of the third core resin portion are shaped to be locked in the third direction.

5. The connector of claim 1, wherein:

the one end parts of a plurality of the first terminals and the one end parts of a plurality of the second terminals are aligned and arranged along the third direction, the one end parts of a plurality of the third terminals are adjacent to the one end parts of the first terminals and the one end parts of the second terminals in the third direction and aligned and arranged along the second direction, recesses recessed toward a base end side in the first direction are formed in outer parts in the second direction in the one end part of the first core resin portion and the one end part of the second core resin portion, a pair of third projecting portions projecting in the third direction and arranged in the respective recesses are formed on both side parts in the second direction in the one end part of the third core resin portion, and parts forming the respective recesses in the one end part of the first core resin portion and the one end part of the second core resin portion, and a part of the third projecting portion are shaped to be locked in the third direction.

6. The connector of claim 1, wherein:

the one end parts of a plurality of the first terminals and the one end parts of a plurality of the second terminals are aligned and arranged along the third direction, the one end parts of a plurality of the third terminals are adjacent to the one end parts of the first terminals and the one end parts of the second terminals in the third direction and aligned and arranged along the second direction, overlapping portions overlapping the one end part of the third core resin portion from a tip side in the first direction are respectively formed to project in the third direction on the one end part of the first core resin portion and the one end part of the second core resin portion, the overlapping portions are formed with through holes penetrating in the first direction or cutout grooves cut from outer side end surfaces in the second direction to penetrate in the first direction, and fitting portions projecting toward the tip side in the first direction and fit into the through holes or the cutout grooves are formed on the one end part of the third core resin portion.

7. The connector of claim 6, wherein the third terminals are formed to penetrate through the fitting portions.

* * * * *